United States Patent
Dunn et al.

(10) Patent No.: US 7,620,041 B2
(45) Date of Patent: Nov. 17, 2009

(54) AUTHENTICATION MECHANISMS FOR CALL CONTROL MESSAGE INTEGRITY AND ORIGIN VERIFICATION

(75) Inventors: Jeffrey H. Dunn, Ellicott City, MD (US); Cynthia E. Martin, Columbia, MD (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1342 days.

(21) Appl. No.: 10/825,777

(22) Filed: Apr. 15, 2004
(Under 37 CFR 1.47)

(65) Prior Publication Data
US 2005/0243798 A1      Nov. 3, 2005

(51) Int. Cl.
*H04W 4/00* (2006.01)
(52) U.S. Cl. .................. 370/389; 713/151; 726/15
(58) Field of Classification Search .......... 713/151; 370/464, 389; 380/255; 455/410; 726/15
See application file for complete search history.

(56) References Cited

U.S. PATENT DOCUMENTS

| | | | |
|---|---|---|---|
| 7,033,118 B2* | 4/2006 | Hilfiker | 405/262 |
| 7,480,284 B2* | 1/2009 | Wengrovitz et al. | 370/352 |
| 7,529,186 B2* | 5/2009 | Smethurst et al. | 370/229 |
| 2003/0061507 A1* | 3/2003 | Xiong et al. | 713/201 |
| 2003/0188159 A1* | 10/2003 | Josset et al. | 713/163 |
| 2004/0205336 A1* | 10/2004 | Kessler et al. | 713/160 |
| 2005/0009501 A1* | 1/2005 | Kekki | 455/410 |
| 2005/0044350 A1* | 2/2005 | White et al. | 713/151 |
| 2005/0102497 A1* | 5/2005 | Buer | 713/150 |
| 2005/0198531 A1* | 9/2005 | Kaniz et al. | 713/201 |
| 2005/0232193 A1* | 10/2005 | Jorgensen | 370/329 |
| 2008/0107094 A1* | 5/2008 | Borella et al. | 370/342 |
| 2008/0229095 A1* | 9/2008 | Kalimuthu et al. | 713/153 |

OTHER PUBLICATIONS

S. Kent and R. Atkinson, "Security Architecure for the Internet Protocol" IETF RFC 2401, Nov. 1998, 62 pages.

* cited by examiner

*Primary Examiner*—Olisa Anwah
(74) *Attorney, Agent, or Firm*—Carlson, Gaskey & Olds, PC

(57) ABSTRACT

The present invention incorporates methodologies developed in the Internet Engineering Task Force (IETF) Internet Protocol Security (IPSEC) Working Group into asynchronous transfer mode (ATM) and frame relay (FR) signaling to provide message integrity and origin authentication. In one implementation the invention provides a virtual private network (VPN) infrastructure with call control message integrity, origin verification, and transit network filtering. The invention utilizes a set of control plane messages based on the IPSEC authentication header (AH) methodology to provide these security mechanisms for ATM and FR network switching equipment and signaling protocols. This abstract itself is not intended to limit the scope of this patent. The scope of the present invention is pointed out in the appending claims.

15 Claims, 13 Drawing Sheets

AUTHENTICATION MECHANISMS FOR CALL CONTROL MESSAGE INTEGRITY AND ORIGIN VERIFICATION

TECHNICAL FIELD

The present invention relates generally to utilizing authentication header methodology in providing security mechanisms for asynchronous transfer mode and frame relay network switching equipment and signaling protocols.

BACKGROUND

Asynchronous transfer mode (ATM) and frame relay (FR) are deployed extensively as the broadband backbone and Internet protocol (IP) data backhaul, respectively. One purpose of this deployment is to integrate voice and data communications and provide virtual private network (VPN) services to small- and medium-sized business customers. Network service providers are utilizing in-band signaling mechanisms, such as ATM user-network interface version 4.0 (UNI 4.0). Inherent in these mechanisms is the danger of bypassing traditional protection mechanisms, such as firewalls, and exposing sensitive information to global public Internet networks. Providers are also employing classic IP over ATM, local area network emulation, or multiprotocol over ATM (MPOA) over global networks; all of which further exacerbate these security concerns.

This method of network access from a local IP network into a public ATM or FR backbone involves an entirely new set of threats to the IP infrastructure. While the inherent complexity of ATM and FR protocols makes it difficult to identify all vulnerabilities that may exist and to predict all control plane threats, the following example illustrates one new threat scenario. End system address spoofing provides a simple method for carrying out denial of service and unauthorized information access attacks. Since ATM routing allows multiple routes to a destination, new calls may be routed to the attacker, denying service. Once the call to the attacker is established, the attacker can access the legitimate caller, providing unauthorized access to information. Further, the attacker can force callers to provide their addresses in the call control messages and use this information to spoof their addresses. As a result, security mechanisms at the call control layer are needed to prevent these kinds of attacks.

Existing ATM and FR security mechanisms are tunnel based, i.e., they operate on the network layer, providing reliable transport services to the call control layer and provide secure tunnels between physical interfaces. As a result, they will be referred to as tunnel mode mechanisms. Tunnel mode mechanisms are inherently limited as they cannot provide call control message integrity per virtual interface origin verification or transit network filtering.

The Internet Engineering Task Force (IETF) Internet Protocol Security (IPSEC) Working Group has produced a series of specifications that address various IP security services including authentication, encapsulation, key exchange, encryption algorithms, and their interactions. It has also provided an architectural guideline for network designers in their development of secure IP services.

Included in these IP security services are those that invoke authentication header (AH) methodology to provide control message integrity and origin verification. FIG. 1 illustrates the IPSEC reference model employing both the encapsulation security payload (ESP) 102 and the AH 104 protocols. The ESP protocol also provides message integrity and origin verification security services as well as encryption services. The two protocols can be run independently or in conjunction with each other. By way of examples, FIG. 2 illustrates the use of an AH protocol in an IP packet while FIG. 3 illustrates the use of an ESP protocol in an IP packet. These protocols provide access control and security management. Both AH and ESP can be activated in one of two modes: tunnel mode and transport mode. In tunnel mode, the protocols provide security mechanisms for the IP protocol layer. In transport mode, they provide security mechanisms for the protocol layers above the IP protocol layer (e.g., the Transmission Control Protocol 108 and the User Data Protocol 110 layers).

The IPSEC architecture defines the type and application of, and administrative authority for, security mechanisms. This information is collectively referred to as security service definitions. These service definitions can be entered into the network elements via manual or automated mechanisms. They are stored in a security policy database (SPD). Information in the SPD determines the security constraints on incoming and outgoing packets on a per-interface basis. FIG. 4 is a block diagram illustrating IP transport security associations. As illustrated in FIG. 4, a security association (SA) (items 402 and 404) may be established between two interfaces (items 406 and 408) based on information in the SPD. The SA is similar to the ATM virtual circuit (VC) characteristics, such as forward peak cell rate, in that the SA is unidirectional and only significant to the directly attached interfaces. A given physical interface may have several virtual interfaces, such as multiple network service access point (NSAP) addresses on the user side of a UNI. As a result, each virtual interface will have its own set of SAs. As with any system relying on unique, per-instance security attributes, this system does not scale well for large numbers of virtual interfaces per physical interface; however, as the SA is unique to a physical interface, the set of SAs for a given interface may be stored in individual databases.

The transport mode SA consists of a security parameter index (SPI), an IP destination address, and the security protocol identifier, either AH or ESP. A unique SA is required for each direction and security protocol supported on each interface, e.g., a bidirectional association between peers supporting AH and ESP would require four SAs. The SAs are held in each physical interface's SA database (SAD). This allows the system to apply a specific security policy based on IP address. Both the SPD and SAD must be accessed for all incoming and outgoing traffic. This application of policies ensures that all traffic is scrutinized before forwarding occurs. Use of SAs are well-known in the art (e.g., "Security Architecture for the Internet Protocol," article by S. Kent and R. Atkinson, IETF RFC 2401, Nov. 1998).

The IPSEC Working Group has also defined a key distribution protocol, Internet key exchange (IKE). IKE is the preferred cryptographic key management service for the ESP security protocol and is used with the security algorithms to provide multiple keys for encryption and authentication. IKE provides automated key management for a dynamic secure operating environment in large, complex networks.

Various embodiments of the present invention utilize one or more of the above described IPSEC features to provide additional security with respect to the call control layer of these signals, and does so in a transport mode. This provides a more robust transport-based security mechanism for providing control plane security for ATM and FR signaling.

SUMMARY

The invention provides a transport mode security mechanism by incorporating the IPSEC authentication header security mechanisms into the call control layer. The objective of this design is to provide security assurances to the ATM and FR signaling messages. This architecture forces the ATM and FR signaling messages to be verified at each ATM or FR node using standard features in IP security architecture—in particular, security policy databases (SPDs) and security association database (SADs).

These and other features of the invention will be more fully understood by references to the following drawings.

BRIEF DESCRIPTION OF THE DRAWINGS

The detailed description is described with reference to the accompanying figures. In the figures, the left-most digit(s) of a reference number identifies the figure in which the reference number first appears.

DETAILED DESCRIPTION

The present invention applies IPSEC AH methodology to ATM and FR control plane security (CPS). This new CPS architecture is a transport-based authentication methodology, providing message integrity and data origin verification for the control plane. The objective of this design is to provide security assurances to the ATM and FR signaling messages. This architecture forces the ATM and FR signaling messages to be verified at each ATM or FR node using a similar type of SPD and SAD as in the IP architecture.

Figure 5:
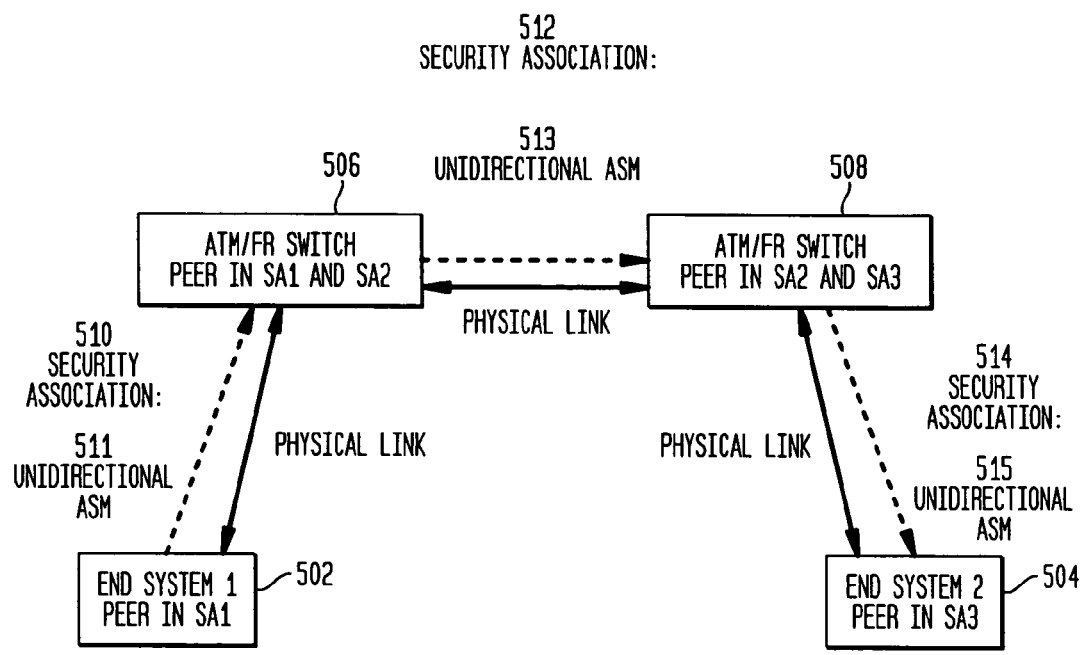
FIG. 5 is a block diagram illustrating ATM and FR control plane security transport architecture according to an embodiment of the invention.

FIGS. 5, 6, 7 and 8 address various embodiments of the present invention. FIG. 5 is a block diagram illustrating ATM and FR control plane security transport architecture according to an embodiment of the invention. In particular, FIG. 5 illustrates a simple network with two end systems 502, 504 and two intermediate systems 506, 508. Between end system 502 and intermediate system 506, there exists a security association (SA) 510 and a depicted unidirectional authentication setup message (ASM) 511 to support the communication to occur (either ATM or FR). Similar SAs 512, 514 and unidirectional ASMs 513, 515 between depicted item 506-508 and 508-504 links, respectively support additional communication links.

Figure 6:
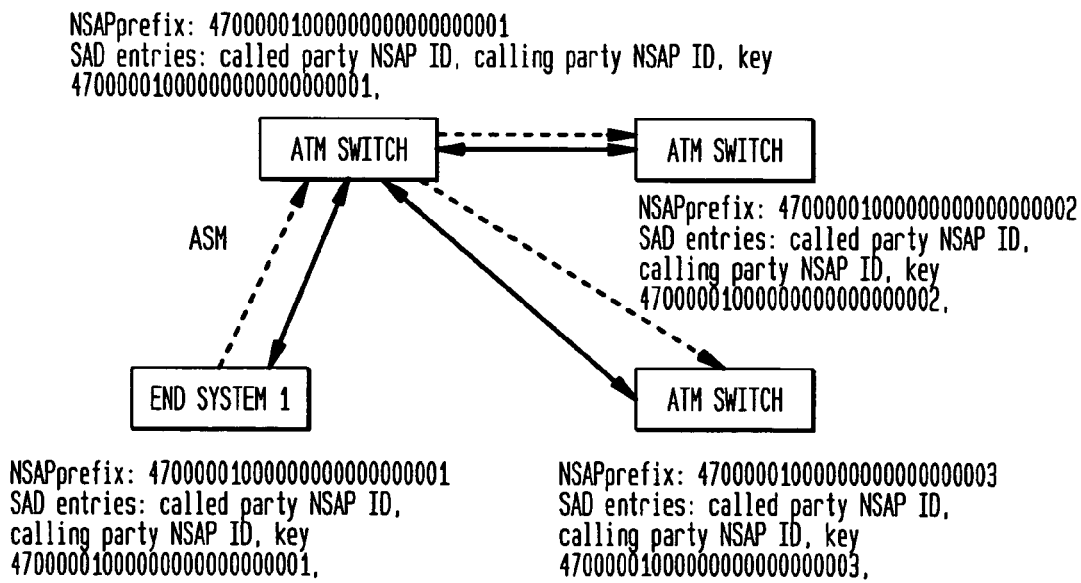
FIG. 6 a block diagram illustrating the contents of SAD entries used in an ATM embodiment of the invention.
Figure 7:
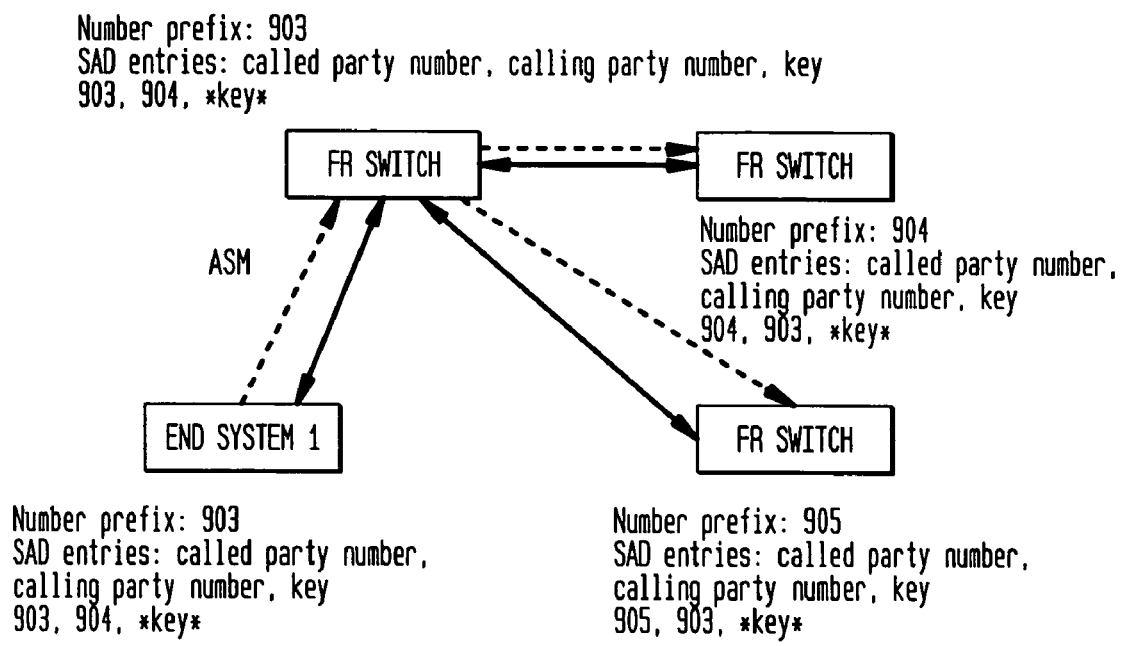
FIG. 7 a block diagram illustrating the contents of SAD entries used in an FR embodiment of the invention.
Figure 8:
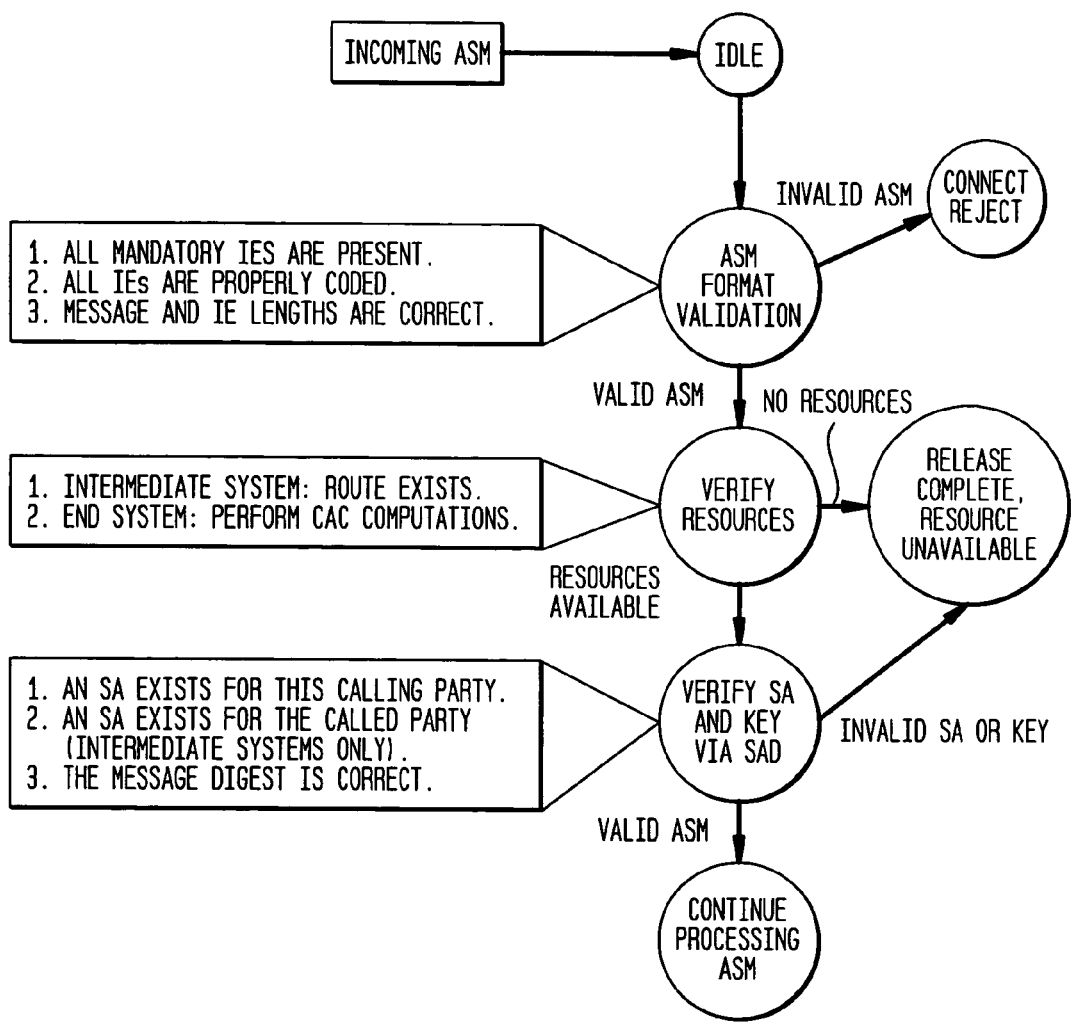
FIG. 8 is a flow chart of the decision making process employed by an embodiment of the invention in the authentication setup message.

FIG. 6 is a block diagram illustrating the contents of SAD entries used in an ATM embodiment of the invention. In particular, each SAD entry for the ATM example of the FIG. 6 comprises the called party NSAP ID, the calling party NSAP ID and a key. FIG. 7 a block diagram illustrating the contents of SAD entries used in an FR embodiment of the invention. Each SAD entry for the FR example of FIG. 7 comprises the called party number, the calling party number and a key. FIG. 8 provides a flow chart with the decision making process for these ASMs. The specifics of these processes will be described below in each of the sections which discuss in detail ATM and FR embodiments of the invention.

Figure 9:
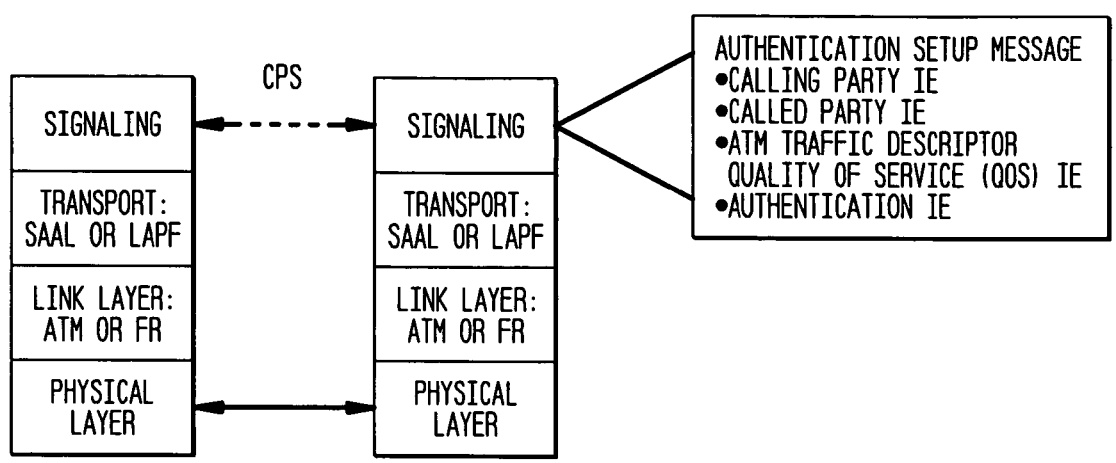
FIG. 9 is a block diagram illustrating the ATM and FR control plane security signaling model according to one embodiment of the invention.

FIG. 9 is a block diagram illustrating the ATM and FR control plane security signaling model according to one embodiment of the invention. As illustrated in FIG. 9, the architecture model for signaling used in the present invention consists of the same services and methodologies as the IP security architecture. However, this architecture of the present invention differs from the prior art in that it defines the security mechanism in transport mode on the control plane. In particular, FIG. 9 depicts a signaling ATM adaptation layer for ATM mode and a link access procedure (LAPF) for FR. Further, this architecture is divided into two categories: (1) control plane authentication and data integrity and (2) support services. These support services include key exchange and security database manipulation.

This application of this invention will be discussed with respect to each signaling protocol.

ATM Control Plane Security

ATM Control Plane Security Model

ATM security is a relatively new development in the ATM Forum. The ATM Forum has defined several ATM security specifications to address authentication, confidentiality, and data integrity. The ATM security scope is defined by the ATM architecture (FIG. 10) and the three ATM planes: user 1002, control 1004, and management 1006. The user plane 1002 is responsible for the transmission of user data. The control plane 1004 handles call control functions between network elements. The management plane 1006 coordinates the management between the user and control plane. The present invention only addresses the control plane.

Figure 10:
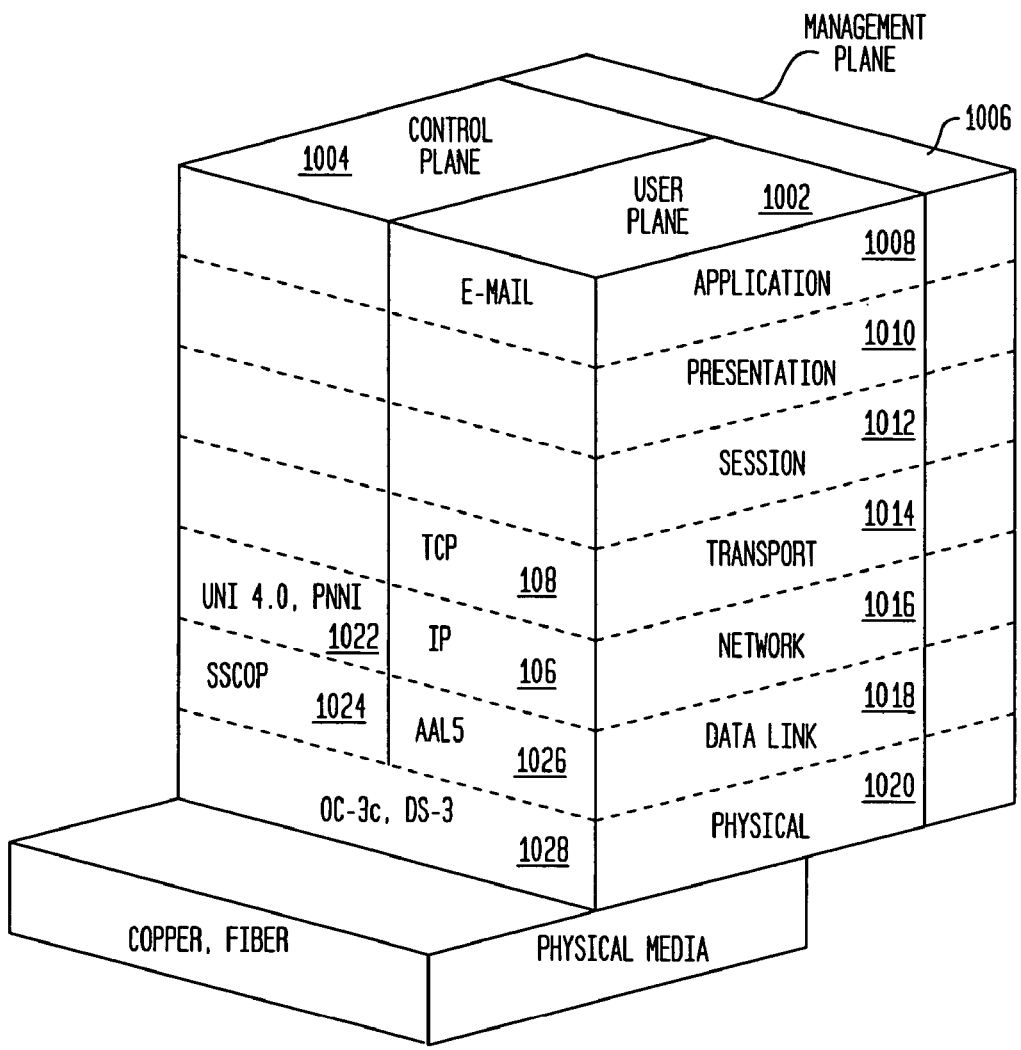
FIG. 10 is a three-dimensional illustration of the ATM plane architecture.

For a better understanding of the ATM architecture depicted in FIG. 10, additional features noted therein will now be briefly discussed. In the user plane 1002, "e-mail" is illustrated as an Application layer 1008 example. Similarly, TCP 108 and IP 106 are illustrated in the user plane 1002 at the Transport 1014 and Network 1016 layers, respectively. By way of comparison, Private network-network interface (PNNI) and User-network interface (UNI) are illustrated in the control plane 1004 at the Network layer 1016. At the Data link layer 1018, Service specific connection oriented protocol (SSCOP 1024) and ATM adaptation layer type 5 (AAL5 1026) are depicted in the control plane 1004 and user plane 1002, respectively. At the physical layer 1020, no distinction exists between the control plane 1004 and the user plane 1002. That is, both OC-3c (Optical carrier digital signal rate (155 Mb/s), concatenated) and DS-3 (Digital signal level 3 (44.736 Mb/s)) are depicted in a combined plane 1028.

Figure 1:
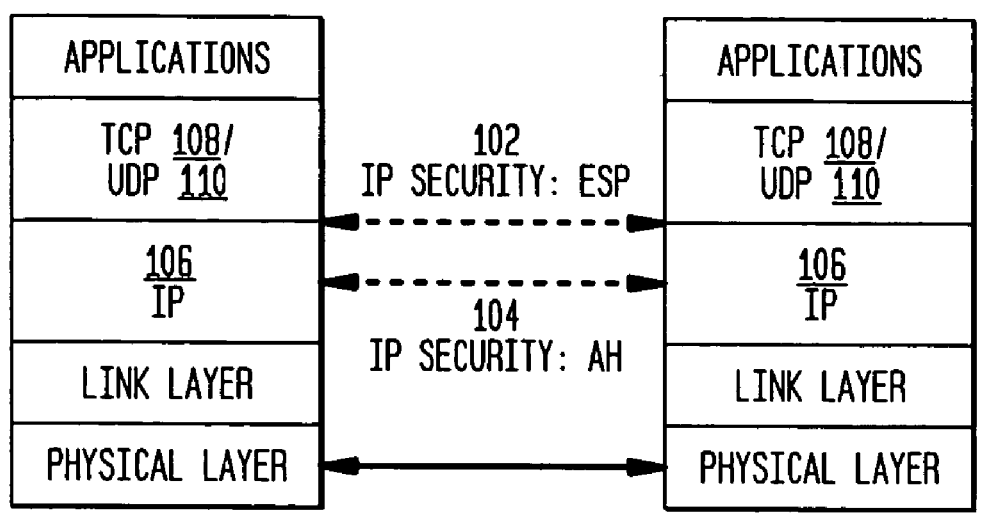
FIG. 1 illustrates the IPSEC reference model.
Figure 2:
FIG. 2 illustrates the use of an AH protocol in an IP packet.
Figure 3:
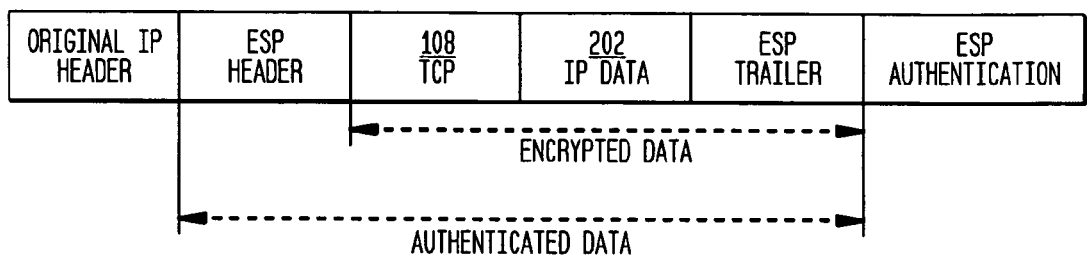
FIG. 3 illustrates the use of an ESP protocol in an IP packet.
Figure 4:
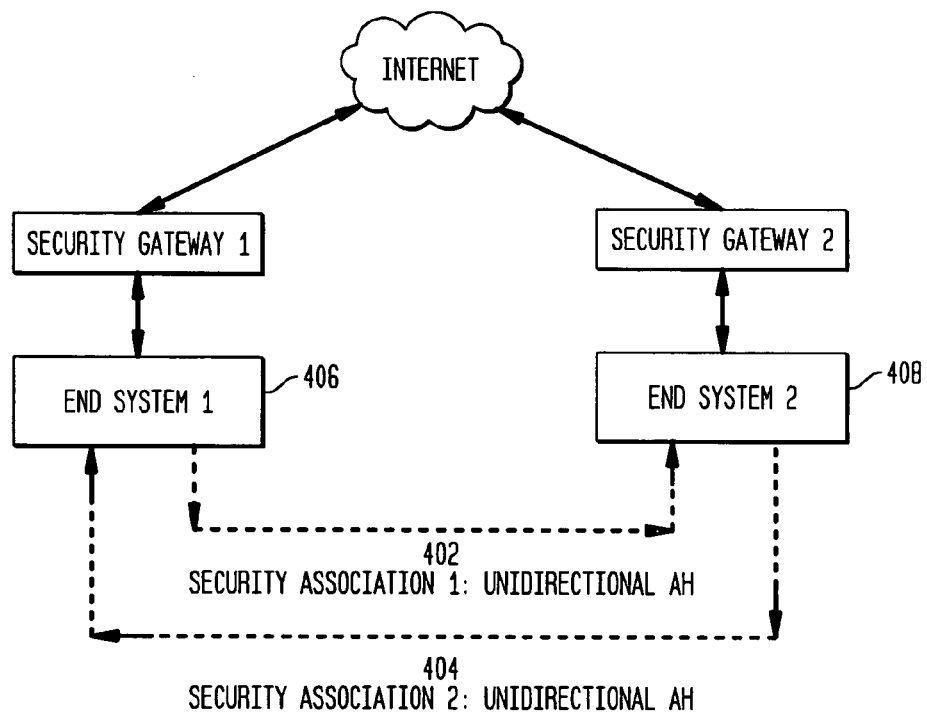
FIG. 4 is a block diagram illustrating IP transport security associations.
Figure 11:
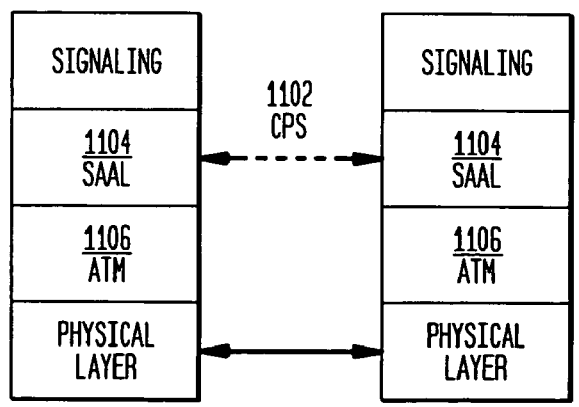
FIG. 11 is a block diagram illustrating the prior art security reference model for ATM signaling.

FIG. 11 is a block diagram illustrating the prior art security reference model for ATM signaling. This ATM CPS provides a signaling authentication mechanism between adjacent signaling peers. The security reference model for ATM signaling depicted in FIG. 11 differs from the IP security reference model illustrated in FIG. 1 in that the ATM CPS 1102 is implemented at a lower protocol layer than ATM signaling, i.e., the signaling ATM adaptation layer 1104 (SAAL). The SAAL provides reliable transport of ATM signaling messages over the ATM layer 1106. The ATM CPS defines new SAAL primitives and states to provide security services for the SAAL. These primitives and states are simplistic, providing only a means to activate the key management state machines between the network elements. Once the SA is established at the SAAL, the signaling messages are transmitted to the next network element. These steps provide one method for authentication and data integrity of signaling setup messages between peers. In IPSEC terminology, the method is similar to tunnel mode and does not provide end-to-end authentication.

The ATM CPS also defines new protocol CPS frames for SAAL to provide the transport of secure SAAL messages for key management. These new frames are similar to the IP security model. The header is authenticated, similar to the IP AH, and the data can be encrypted, similar to the IP ESP.

ATM Control Plane Security Embodiment of the Invention

In contrast to the ATM Forum tunnel mode CPS, which operates at the SAAL layer (as illustrated in FIG. 11), this embodiment of the invention provides ATM transport mode security by operating at the signaling layer. This embodiment includes two previously optional information elements (IEs) in the call setup message: the calling party number IE, used as the index for the key, and the user-to-user IE, used to transport the integrity check value (ICV).

Figure 12:
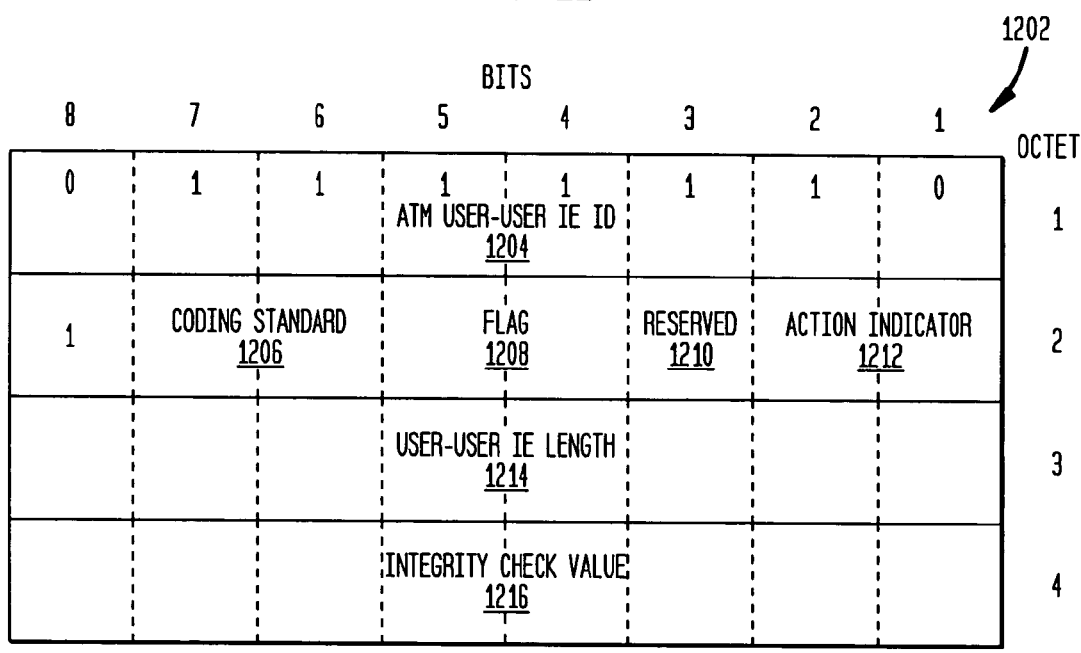
FIG. 12 illustrates the format of the ATM user-user information element of the present invention.

FIG. 12 illustrates the format of the ATM signaling setup message IE of this embodiment of the invention. This format will be defined based on the ATM user-to-user IE and will be referred to as the authentication IE (AIE) 1202. Based on the entries in the SPD, ATM virtual interfaces participating in transport mode SAs will only accept call setups containing the user-to-user IE and will treat its contents as an ICV for the message.

The user data fields in the user-to-user IE will have a field layout similar to the ATM adaptation layer parameters IE. The AIE will have the following fields, meanings, and values:

User-user IE ID 1204. The user-user IE ID identifies the IE as a user-user IE. The user-user IE ID is 8 bits in length with the value 01111110.

Coding standard 1206. The coding standard determines the base international standard for the protocol. The coding standard is 2 bits long with the value 00 for the International Telecommunications Union, Telecommunication Standardization Sector (ITU-T).

Flag 1208. The flag is 2 bits long with the value 00 to represent that the IE instruction field is not significant.

Reserved 1210. The reserved bit is a reserved area for future development. The reserved bit is 1 bit long with the value 0.

Action indicator 1212. The action indicator determines which protocol action should be taken in case of an unrecognized IE. The action indicator is 3 bits long with the value 000 for the clear call and is ignored based on the value of the flag.

User-user IE length 1214. The user-user IE length provides the total length of the IE so that the ICV length can be determined. It is the binary coding of the number of octets of the IE message contents. The user-user IE length is 128 bits in length with the value 00000000 10000000.

ICV 1216. The ICV is identical to the ICV defined in the prior art AH. Note that the SPI and sequence numbers used in the AH are superfluous, since the call reference value will be used in place of the sequence number and the only allowable security protocol authentication hash function is MD5.

In addition to customary information elements for a given message type, two additional information elements are utilized for transport mode CPS in this embodiment of the invention: the authentication information element must be included and the header values must be as listed above. The ICV must be included in the message contents of the AIE and be computed over the entire message, less the AIE, using keyed hashing message authentication codes (HMACs) one-way hash function Message-Digest 5 (MD5). Further, the ATM calling party address and, if a sub-address is used, the ATM calling party sub-address IEs are included to identify the address(es) of the calling party. This is required to access the key in the SAD.

In this embodiment of the invention, the SPD will reside on each ATM node and will contain separate entries for each virtual interface. Further, the SAD will reside on each node and contain keys and their associated index values to be used for computing the message digest. In the absence of a SAD, no security services will be supplied for that interface.

During the integrated local management interface (ILMI) registration process, the switch generates a public key for the registering end system based on the end system NSAP address and a pseudo random number generator. Thus, the switch is the key management authority. Since the maximum strength MD5 key is 128 bits or four 32-bit words, its generation requires the generation of 4 pseudo random and unit uniformly distributed numbers as unsigned integers and truncation of the end system's 20 octet NSAP address to 16 octets. Further, periodic rekeying improves security. As a result, an efficient key generation procedure is required in order that the transport mode CPS be scalable. An additional embodiment of the invention will now be described which provides this feature.

To generate the pseudo random number, prior art algorithms typically require a seed. This seed can be generated using an integer counter, which contains the count of seconds since some epoch. Such a counter has a repeat period of more than 136 years. In order to eliminate the possibility of spoofing this counter, the beginning of the epoch should be different for each switch. The pseudo random number generator need only be re-seeded at switch boot time. Once the generator is seeded, the four unsigned integers can be computed by four successive calls to the generator. Since four sequential call pseudo random numbers are being used for the computation, it is vital that the output of the generator be spectrally white, i.e., that it have no dominant frequencies, as well as that the numbers be independent and identically distributed. Let the four integers generated be denoted as $a_r$, $b_r$, $c_r$, and $d_r$.

Since the first three octets of an NSAP address may be identical for all switches in a given network and the last octet, the selector byte, is generally zero, octets 4 through 19 should be used to generate the 16 octets required for key generation. Let the four integers formed from the address be denoted as $a_a$, $b_a$, $c_a$, and $d_a$. To compute the key, let $a_k = a_a$ XOR $a_r$, $b_k = b_a$ XOR $b_r$, $c_k=c_a$ XOR $c_r$, and $d_k=d_a$ XOR $d_r$. Now, let a<<n denote a left circular shift by n bits; then perform the following operation on the key:

$$x_k=((x_k<<00\ 00\ 00\ 0F\ AND\ x_k)\ AND\ x_a)\ OR\ (NOT\ (x_k)\ OR\ x_r)$$

for x in {a, b, c, d}. This will form the key. In additional embodiments of the invention, the switch periodically generates a new set $a_r$, $b_r$, $c_r$, and $d_r$. This will help to prevent playback attacks. As noted above, a unique SA must be established for each NSAP address supported by a physical interface.

Once the hello finite state machine (HFSM) has reached the two-way inside state, key generation may proceed in much the same manner as for end systems. Again, the switch is the key authority. The one difference in key generation derives from the non-uniqueness of the switch NSAP address and node identifier. Since a switch may have multiple physical and virtual connections, each requiring a unique SA, the NSAP address and the node identifier are not suited to key generation. Instead, the three long words $a_a$, $b_a$, and $c_a$ are formed from octets 9 through 20 of the node identifier, while $d_a$ will be the port identifier associated with this physical or virtual link. Once this is done, key generation may proceed as outlined above.

Keys may be configured statically or dynamically. Static key configuration requires direct administrative intervention and, because it depends on network administrative policy, is not addressed by the present invention. Further embodiments of the invention will now be described in which dynamic key configuration is accomplished using a key exchange procedure. One such procedure is IKE; however, IKE requires that there be an existing connection between peers. In the IETF model, the assumption is that the peers are connected by a connectionless link layer on a broadcast multiple access network. In the case for ATM, the peers are connected by a connection-oriented link layer on a non-broadcast multiple access network. As a result, the key exchange procedure must rely on a permanent VC (PVC). One such existing procedure is ILMI. ILMI uses simple network management protocol (SNMP) to exchange information between switches and end systems in the UNI case or between peer switches in the PNNI case. In a preferred embodiment of the invention, SNMP Version 3 (SNMPv3) is implemented using the appropriate SNMP security level of the authentication protocol identifier. If the network application requires additional security, the authentication protocol identifier and the privacy protocol identifier may be set. Strong key generation and key management procedures used for SNMPv3 directly impact the strong key distribution and management scheme for ILMI. SNMP Version 1 (SNMPv1) has many security deficiencies, including the lack of authentication and message confidentiality mechanisms, and accordingly, is not recommended for use with the present invention. The SNMPv3 information is stored in the network equipment in databases called management information bases (MIBs). The ITU-T has defined MIB object identifiers (OIs) for public key certificates such as MD5. As a result, MD5 keys can be exchanged using ILMI and by implementing the appropriate security OI in a switch's or an end system's MIB.

Intermediate systems must distribute both the keys generated for a particular end system and their own key to each attached end system. In the case of the end system's key, the end system uses its own NSAP address as the index for the key. In the case of the intermediate system's key, the key is indexed using an NSAP address with the end system's network prefix, octets 1 to 13, and an end system identifier of FF FF FF FF FF. This allows the end system to access the intermediate system's key for ILMI exchanges. In the case of peer intermediate systems, shared end systems' keys are indexed by the end system's NSAP address and intermediate system's keys are indexed by PNNI node and port identifiers.

Key Distribution Illustrations

There are six distinct key distribution cases associated with call initiation:

UNI user side outgoing message,
UNI user side incoming message,
UNI network side outgoing message,
UNI network side incoming message,
PNNI outgoing message, and
PNNI incoming message.

Figure 13:
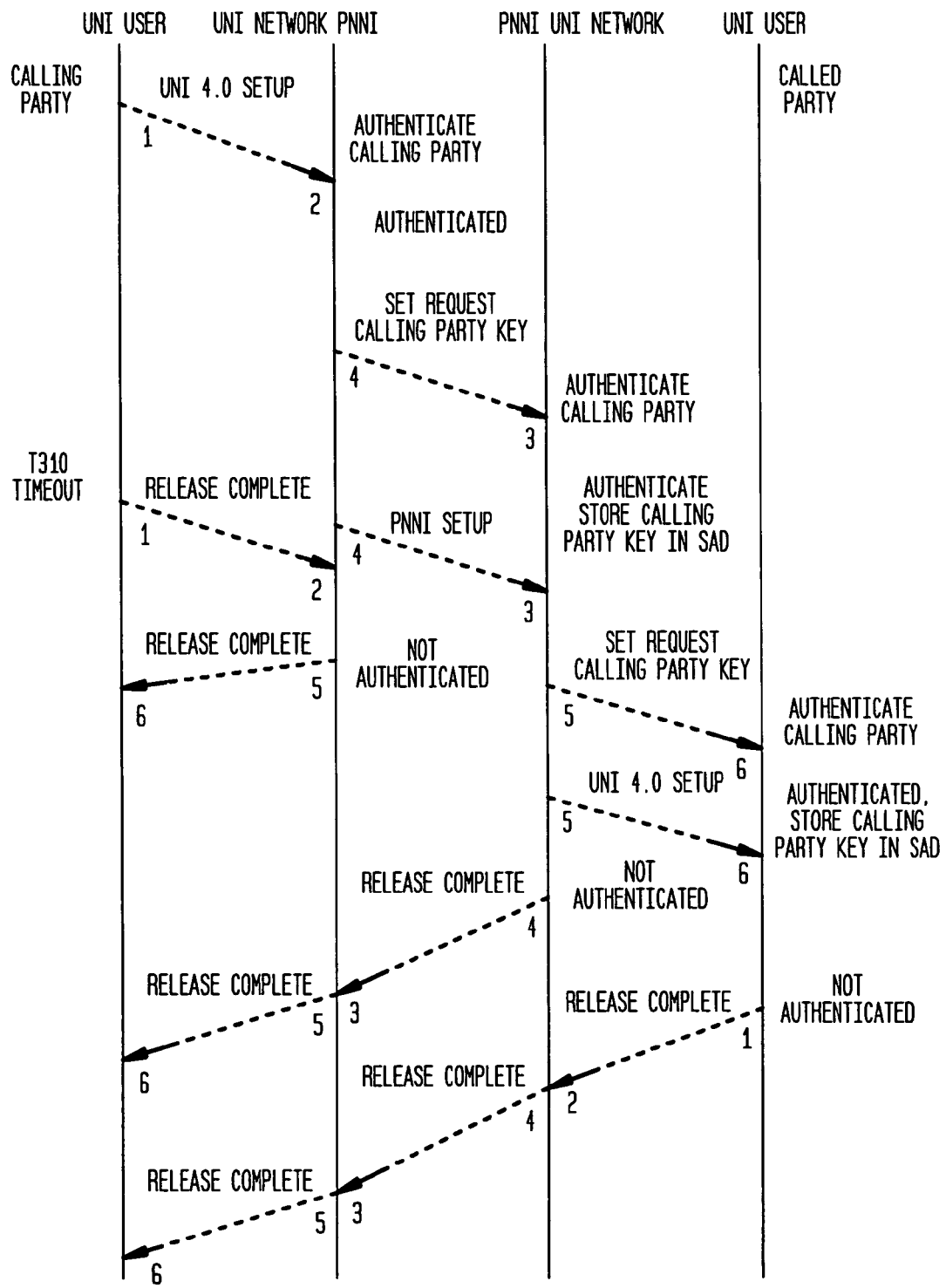
FIGS. 13, 14 and 15 provide graphical representations of the invention's processing of various key distribution cases.
Figure 14:
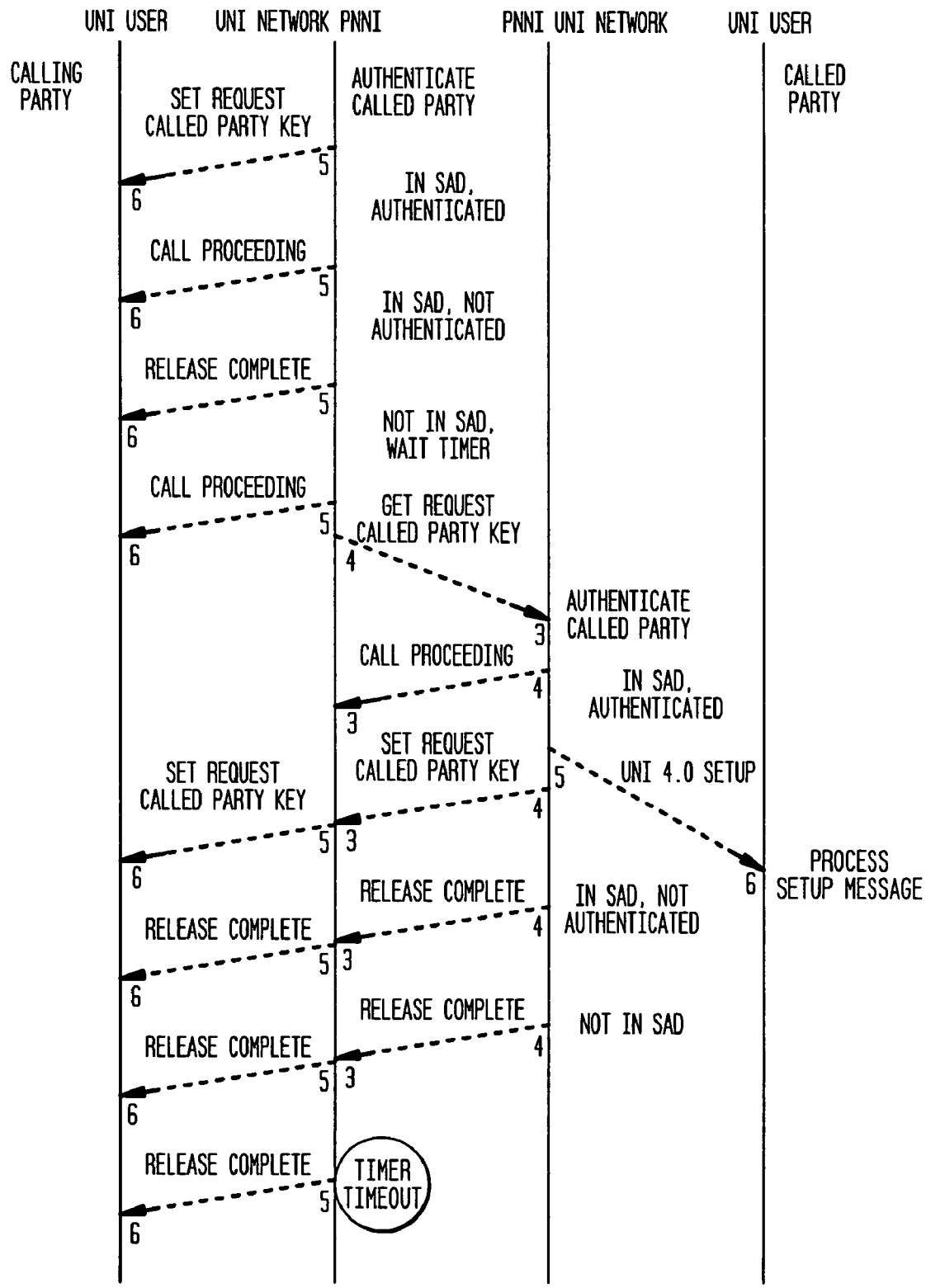
Figure 15:
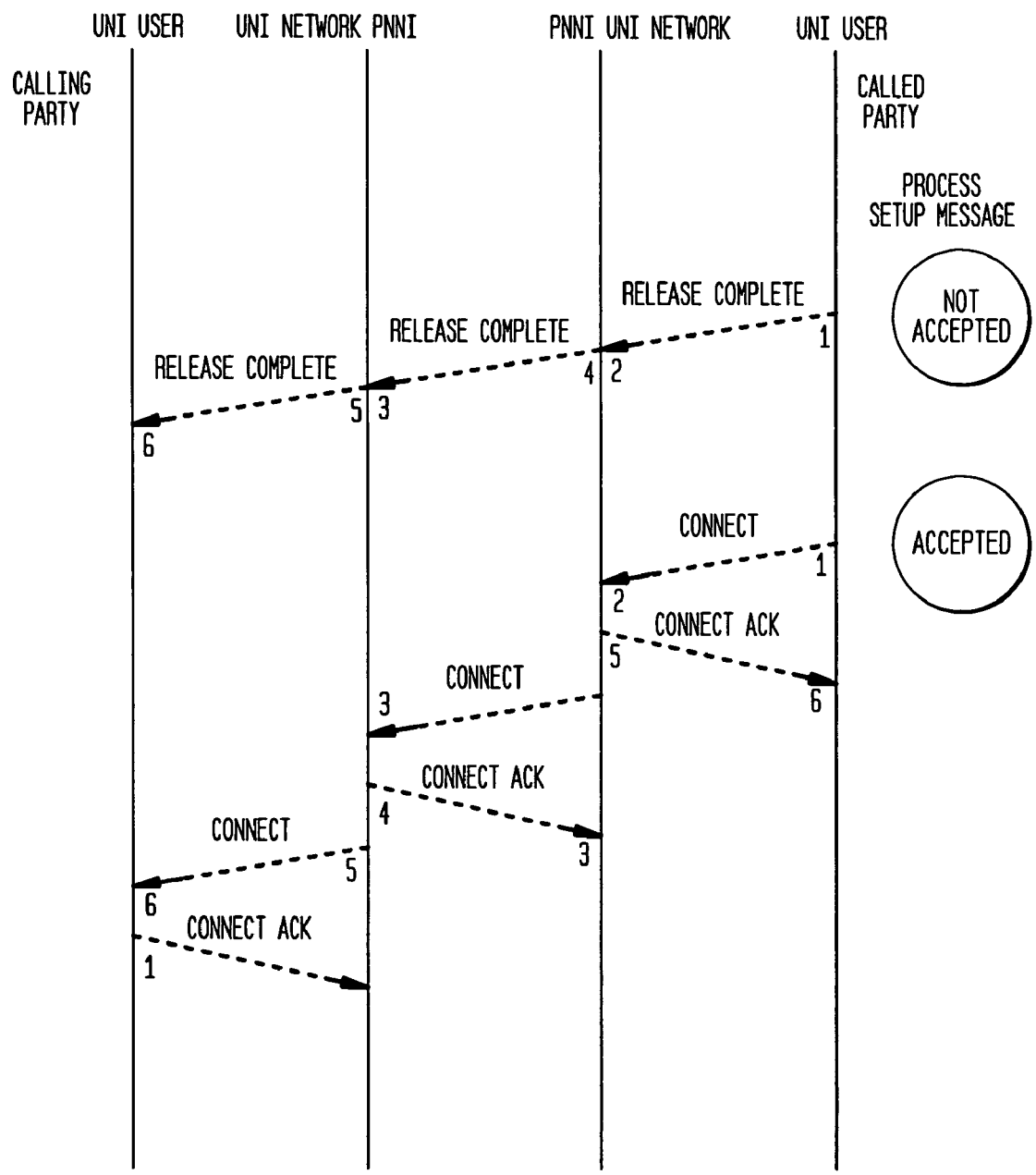

Once the call initiation phase has begun, it is the responsibility of the key authority to flood any key changes to its peers or end systems. In the next six subsections, the state machine for each case will be described in the order in which the state occurs during call initiation. FIGS. 13, 14, and 15 provide a graphical representation of these state machines and their interactions. That is, these figures represent the invention's processing of various key distribution cases. These cases are numbered and described in detail below. These numbers correspond to the numbered paths depicted in the figures. In all signaling and SNMP interactions described below, several underlying assumptions apply. First, all SNMP requests received by an interface must contain the HMAC MD5 digest computed over the entire message, less the digest, with the sender's key. Second, all SNMP requests must be authenticated using the sender's key before being processed. This provides authentication of the key distribution mechanism. Third, all release and release complete messages sent or forwarded by an interface due to authentication or timer failure will contain an AIE with an ICV computed using the sending interface's key. This means that the ICV must be recomputed at each hop. This circumvents the necessity that the calling party has the called party's key and vice versa, which cannot happen if the authentication fails.

Case 1, UNI user outgoing. In the UNI user side outgoing case, the user side sends a setup message to the switch. If it receives a call proceeding, the user side starts the UNI signaling outgoing call proceeding timer, T310. If the set request is received before T310 timeout, the user side waits for a connect message. Otherwise, the user side sends a release complete.

Case 2, UNI network incoming. In the UNI network side incoming interface case, the interface must authenticate the setup message. If the setup message authenticates, the interface generates a designated transit list (DTL) and forwards a set request containing the calling party's key and a PNNI setup, matching the UNI setup received from the user, to the outgoing PNNI interface. If the message does not authenticate, the switch sends a release complete to the calling party. Next, the switch must check its SAD for the called party's key. If it is found, the switch should distribute the key to the calling party via a set request. If not, the switch should forward a get request for the called party's key to the outgoing interface and set a wait timer for the get response containing the called party's key. If the get response is received before timer timeout, the interface authenticates it and, if it authenticates, distributes the key to the calling party via a set request. Otherwise, the interface sends a release to the calling party.

Case 3, PNNI incoming. In the PNNI incoming interface case, the interface authenticates the set request from the previous interface in the DTL. If the request authenticates, the switch stores the calling party's key in its SAD, forwards a set request with the calling party's key, and forwards the setup message received from the previous interface to the outgoing interface. If the message does not authenticate, the interface sends a release complete to the previous interface. If the interface receives a get request for the called party's key, it authenticates the request. If the request authenticates, it searches its SAD. If the key is found, the interface responds with a get response. If not, the interface forwards a get request for the called party's key to the outgoing PNNI interface. Next, the switch sets a wait timer for the get response containing the called party's key. If the get response is received before timer timeout, the switch distributes the key to the calling party. Otherwise, the switch sends a release to both the previous interface on the DTL and forwards a release to the outgoing PNNI interface.

Case 4, PNNI outgoing. In the PNNI outgoing interface case, the interface authenticates the set request from the incoming interface. If the request authenticates, the interface sends a set request with the calling party's key and forwards the setup message to the next interface on the DTL. If the set request does not authenticate, the interface forwards a release complete to the incoming interface. If the interface receives a get request for the called party's key, it authenticates the get request. If the get request authenticates, it sends the get request to the next interface on the DTL. If the get request does not authenticate, the interface forwards a release complete to the incoming interface.

Case 5, UNI network outgoing. In the UNI network outgoing interface case, the interface authenticates the set request from the incoming interface. If the request authenticates, the interface forwards a set request with the calling party's key and a UNI setup message to the called party. If the set request does not authenticate, the interface forwards a release complete to the incoming interface.

Case 6, UNI user incoming. In the UNI user incoming case, the user authenticates the set request from the network side. If the request authenticates, the user stores the calling party's key in its SAD and authenticates the setup message. If the setup authenticates, the user processes the message. Otherwise, the user sends a release complete to the network side.

FR Control Plane Security

Prior Art FR Security Model

Figure 16:
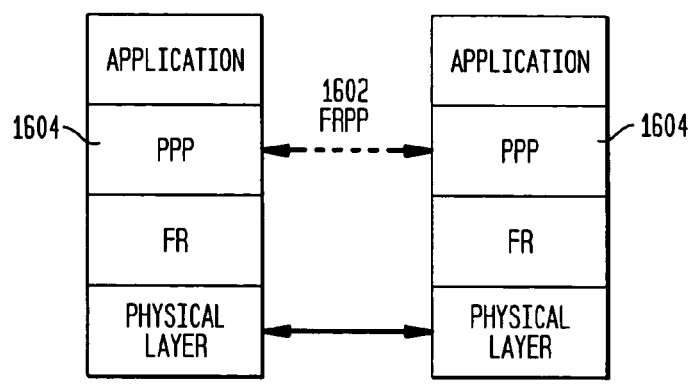
FIG. 16 is a block diagram illustrating the prior art security reference model for FR signaling.

FR security is a relatively new development in the Frame Relay Forum (FRF). The FRF has defined a security specification to address authentication, confidentiality, and data integrity. The FR security scope is defined by a FR privacy protocol (FRPP), which is based on the FRF data compression specification and the series of IETF point-to-point protocol (PPP) specifications, including the PPP link control protocol and PPP encryption control protocol. FIG. 16 is a block diagram illustrating the prior art security reference model for FR signaling. As illustrated in FIG. 16, the FRPP protocol 1602 defines functions that provide authentication and encryption between end systems at the user plane, but not the control plane. In IPSEC terminology, the method is similar to tunnel mode, as opposed to transport mode.

The FRPP 1602 defines new FR control frames for authentication, encryption, and control information to invoke the security between end systems. The FRPP authentication frame allows PPP 1604 to configure the authentication options peer-to-peer until the call is established at the far end. The FRPP encryption frame allows PPP 1604 to configure the encryption options peer-to-peer until the call is established at the far end. Once the PPP tunnel is created end-to-end, the end systems can begin transmitting. The FR key exchange mechanism, called the key update protocol, provides an automated key management system for FRPP. By defining another FRPP FR control frame to update the key, the end system can initiate key updates at any time. Future development of the FR security will be required for security policy enforcement and connection verification.

FR Control Plane Security Embodiment of the Invention

Figure 17:
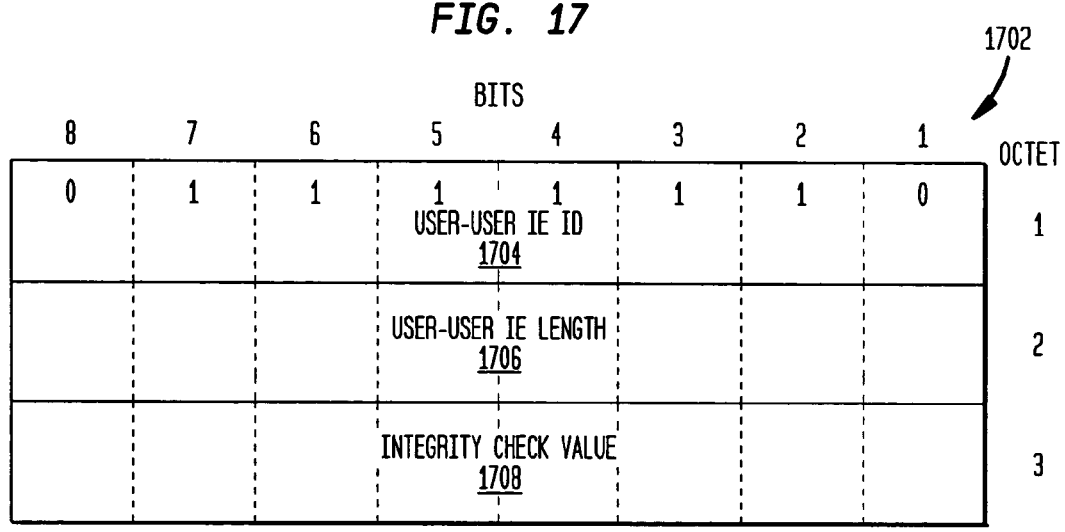
FIG. 17 illustrates the format of the FR user-user information element of the present invention.

In contrast to the FRF's use of PPP and extensions, the FR security reference model of this embodiment of the invention is similar to the IP transport mode security reference model. FIG. 17 illustrates the format of the FR user-user information element of the present invention. As depicted in FIG. 17, a previously optional FR signaling setup message IE is defined based on the user-to-user IE. This will be referred to as the AIE 1702. Based on the entries in the SPD, FR interfaces participating in transport mode SAs will only accept call setups containing the user-to-user IE and will treat its contents as an ICV for the message.

The user data fields in the user-to-user IE will have a similar field layout as the calling party sub-address IE. The AIE will have the following fields, meanings, and values:

User-user IE ID 1704. The user-user IE ID identifies the IE as a user-user IE. The user-user IE ID is 8 bits in length with the value 01111110.

User-user IE length 1706. The user-user IE length provides the total length of the IE, so that the ICV length can be determined. It is the binary coding of the number of octets of the IE message contents. The user-user IE length is 128 bits in length with the value 00000000 10000000.

ICV 1708. The ICV is identical to the ICV defined in, providing the authentication mechanism. Note that the SPI and sequence numbers used in the AH will not be needed here. The call reference value will be used in place of the sequence number.

In this embodiment of the invention and, as in the ATM embodiment described above, two additional information elements are employed for transport mode CPS: the authentication information element must be included and the header values must be as listed above. The ICV must be included in the message contents of the AIE and be computed in the same fashion as in the ATM case. Again, it is mandatory that the calling party address IE be included to identify the address of the calling party; however, it is also mandatory that a calling party sub-address IE be included and that the sub-address be a unique NSAP address. This is required to generate the key and access it in the SAD.

The SPD will reside on each FR node and will contain separate entries for each virtual interface. The SAD will reside on each node and contain keys and their associated index values to be used for computing the message digest. In the absence of a SAD, no security services will be supplied for that interface.

End system key generation and authority are performed essentially in the same manner as the above described embodiment of the invention which addressed the ATM case. Each user interface must be assigned a unique 20 octet NSAP address to be sent in signaling messages as a sub-address. The only difference between FR and ATM is that, in the absence of ILMI, an administratively configured PVC must be established between the end and intermediate systems. Alternatively, a reserved data link connection identifier (DLCI) may be designated by the network administrative authority and LMI may be used to establish the PVC at system boot time.

Intermediate system key generation and authority are also performed in the same manner as the ATM embodiment described above, except a unique interface index object identifier (ifIndex OI) is used instead of the interface identifier to initialize the four octets of $d_a$.

As with ATM, keys may be configured statically or dynamically. In the case of dynamic key distribution, six cases exist that are identical to the ATM cases. Each interface and state machine is identical to the above described ATM embodiment with two minor differences—the first being the requirement that a reserved DLCI be designated to transmit SNMP requests and responses and the second being that a set of transit network identifiers is substituted for the DTL.

Interworking Security

Since both ATM and FR employ identical IEs and OIs to distribute and store keys, respectively, with the present invention interworking between FR and ATM networks should be transparent to the user. Because there exists a standard mapping between ATM and FR signaling messages, the signaling entities on the user interfaces need not be concerned whether the called party is of similar or dissimilar link layers. Further, since an NSAP sub-address is required for the FR interface, the numbering plans for both FR and ATM user interfaces may be identical. Thus, FR and ATM interfaces may establish authenticated communication sessions with each other transparently.

System Design Considerations

The new CPS architecture for ATM and FR of the present invention can be directly incorporated into systems and network designs based on existing ATM and FR implementations. Because the AIE and the public key OI are standards-based, no changes are required in the existing ATM or FR message handling portions of the signaling state machines. Further, since the authentication occurs before a message is passed to the state machine, no additional computational burden is placed on that state machine, obviating the need to change timers. No changes to the existing state machines are required when implementing transport CPS.

ATM Implementation

As stated above, no changes are required in the UNI, ILMI, or PNNI state machines. In the case of the signaling protocols, the ATM signaling state machine (SSM) acts like a shim layer protocol. In the user incoming case, it passes the authenticated message to the signaling layer or tears down the call. This allows for rapid call denial in the case of authentication failure. In the user outgoing case, it computes the message digest for the signaling message it receives from the signaling layer, creates the AIE, and appends it to the message. In the network incoming side, the ATM SSM forwards the authenticated message to the outgoing interface or tears down the call. In the network outgoing case, it simply forwards the message.

In the case of ILMI, the ATM SSM is also a shim layer protocol. Since SNMP messages do not contain information uniquely identifying the source of the message, such as the NSAP address, each message must contain both a message digest and public key certificate OI containing the MD5 key for the sender. In all cases, messages are authenticated using the key from the SAD, even when the message contains a new key for the sender.

In the case of a user side interface, the ATM SSM has two tasks. First, it must use its own key to compute a message digest for outgoing SNMP messages it receives from ILMI. Second, it must use the attached intermediate system's key to authenticate incoming messages before they are passed to ILMI.

In the intermediate system case, the ATM SSM subsumes two independent functions, message management and key management. The message management task must generate message digests and authenticate messages. The key management task has three basic functions. First, it periodically updates keys for the intermediate system and its attached end systems. Second, it also stores authenticated keys from other intermediate and end systems in the SAD. Third, it generates SNMP get requests to obtain keys not in the SAD.

FR Implementation

As with ATM, no changes are required in the FR UNI or NNI signaling state machines. As a result, the FR signaling implementation of the SSM shim layer protocol is identical to the ATM implementation.

Since FR does not have an existing SNMP-based state machine like ILMI, the SNMP portion of the FR SSM is much more complex than its ATM counterpart. As a result, the FR SSM has three independent functions: message management, key management, and MIB management. The first two are identical to the ATM case and need not be further discussed. The MIB management task is responsible for handling SNMP requests not associated with security functions, such as cold start procedures and MIB accesses.

VPN Implementation

In additional embodiments of the invention, the creation and administration of VPNs can be easily accomplished using the SPD entries. This approach has several strengths. First, end systems are unaware of restrictions and policies, allowing for greater security against malicious user attacks. Second, a new VPN or member of an existing VPN can be included simply by adding or updating SPD entries. The set of systems served by all intermediate systems in a VPN is identical; therefore, the set of SPD entries is identical for all intermediate systems serving a VPN. The SPD can updated globally rather than on a system-by-system basis. Third, since there is an SA for every pair of interfaces, including those on the same system, each intermediate can support $2^{32}$ VPNs, one for each value of the port identifier. Fourth, by identifying the VPN by port identifier, the VPN restrictions do not interfere with PNNI routing.

Figure 18:
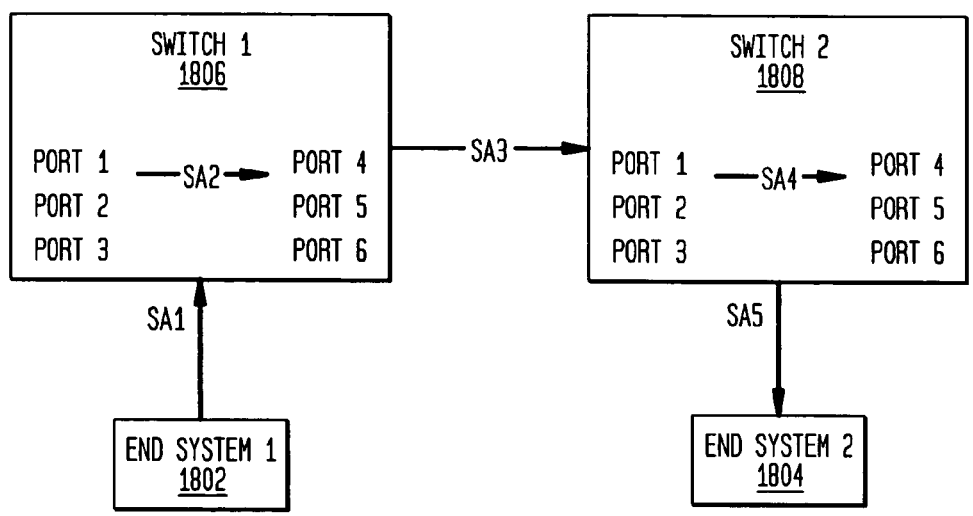
FIG. 18 is a block diagram illustrating a VPN example of the present invention.

FIG. 18 illustrates an example of multiple VPN support according to a further embodiment of the invention. FIG. 18 depicts a simple network with two end systems 1802, 1804 and two intermediate systems 1806, 1808. Each end system (in this case an FR access device) supports three VPNs, each uniquely identified by an NSAP address. Each intermediate system supports three VPNs on each of its ports.

TABLE 1

Virtual Private Network Security Associations

| Security Association (SA) | Interface 1 Network Service Access Point | Interface 1 Port ID | Interface 2 Network Service Access Point | Interface 2 Port ID |
|---|---|---|---|---|
| 1 | 47000001000000000000000100 | N/A | 47000001000000000000000000 | 1 |
| 2 | 47000001000000000000000000 | 1 | 47000001000000000000000000 | 4 |
| 3 | 47000001000000000000000000 | 4 | 47000002000000000000000000 | 1 |
| 4 | 47000002000000000000000000 | 1 | 47000002000000000000000000 | 4 |
| 5 | 47000002000000000000000000 | 4 | 47000002000000000000000100 | N/A |

Table 1 lists the SAs for one of the VPNs depicted in FIG. 18. Because port 1 on both switches is only authorized to communicate with port 4, no information can pass into or out of the VPN.

Additional Considerations

Two classes of issues may negatively impact SSM implementations. First, SSM processing may increase message processing times, negatively impacting message processing speed and control plane throughput. Second, call rejection associated with security restrictions may negatively affect routing algorithms and procedures. These issues are addressed in the following subsections.

Message Processing Speed

Although the SSM does not directly interact with other state machines, the processing time associated with authentication will increase the total message processing time per interface. If the authentication portion becomes too large, protocol timers may time out, leading to retransmission of requests and acerbating switch congestion. As a result, some implementation considerations arise.

First, SPD and SAD access may require a considerable amount of time relative to protocol timers. This time will increase with the size of the databases. In an additional embodiment of the invention, a method is employed for circumventing key access time increase. In particular, each interface is provided with a content addressable memory, indexed as described above, containing all keys of directly attached systems, all interfaces participating in active calls, and, in the case of intermediate systems, all authorized ports on the system itself. This will bound key lookup time in time critical cases.

Second, computation of the MD5 digest is computationally intensive. This is especially true if the computation is performed on the system's central processing unit, which is typically engaged on many other tasks. In an additional embodiment of the invention each interface is provided with a compute engine thereby solving the problem of a system with control message congestion. If a given interface becomes congested, it will not affect other interfaces on the same system. Various alternative embodiments exist for providing this capability, including field programmable gate arrays, network processors, and special purpose MD5 processors.

Routing

Because SSM functions as a shim layer protocol with its own databases, it does not directly affect control or user plane routing protocols; however, authorization failures may indirectly impact routing efficiency. For example, in PNNI routing, if several routes exist, the one with the most capacity available will be chosen. If the calling party is not authorized to use this route, perhaps because it employs high-speed connections that this particular customer has not paid for, the call will be rejected. PNNI will then institute crankback procedures to reroute the call. This is one of the strengths of the SSM approach; however, there are two issues that may arise. First, if there is no set of SAs between the calling and called party, several crankback iterations may occur, negatively impacting the performance of the intermediate system attached to the calling party. Therefore, the number of crankback iterations should be limited. Second, if the call fails due to authorization failure, the intermediate system attached to the calling party may delete the called party's intermediate system from its routing tables. Therefore, in a preferred embodiment of the invention, systems should not alter routing tables based on call failure alone. Routes should only be deleted in cases where the cause code in the call release message indicates that no route exists or that a network failure has occurred.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

| Acronym Appendix | |
|---|---|
| AH | authentication header (from IPSEC) |
| AIE | authentication IE (information elements) |
| ASM | authentication setup message |
| ATM | asynchronous transfer mode |
| BMA network | broadcast multiple access network |
| CAM | content addressable memory |
| CLIP | classical IP over ATM |
| CPS | (ATM) control plane security |
| DLCI | data link connection identifier |
| DTL | designated transit list |
| ECP | encryption control protocol |
| ESP | encapsulation security payload |
| FPGA | field programmable gate arrays |
| FR | frame relay |
| FRF | frame relay forum |
| FRPP | FR privacy protocol |
| HFSM | hello finite state machine |
| HMAC | keyed-hashing message authentication codes |
| ICV | integrity check value |
| IE | information elements |
| IETF | internet engineering task force |
| IKE | internet key exchange |
| ILMI | integrated local management interface |
| ILMI | integrated local management interface |
| IP | internet protocol |
| IPSEC | internet protocol security |
| ITU-T | international telephony union-telecommunication standardization sector |
| LANE | local area network emulation |
| LCP | link control protocol |

-continued

Acronym Appendix

| | |
|---|---|
| LMI | local management interface |
| MD5 | message-digest 5 |
| MIB | management information base |
| MPOA | multi-protocol over ATM |
| NSAP | network service access point |
| NSAP | network service access point |
| OI | object identifiers |
| PCR | peak cell rate |
| PNNI | Private network-network interface |
| PPP | point to point protocol |
| PVC | permanent virtual circuit |
| SA | security association (between two interfaces) |
| SAAL | signaling ATM adaptation layer |
| SAD | SA (security association) database |
| SNMP | Simple network management protocol (e.g., snmpv3) |
| SPD | security policy database |
| SPI | security parameter index |
| SSM | signaling state machine |
| UNI | user-network interface |
| VC | Virtual circuit |
| VPN | Virtual private network |

What is claimed is:

1. A method of providing security mechanisms for Internet communications, said communications comprising a plurality of protocol layers including an IP protocol layer and at least one protocol layer above the IP protocol layer; said method comprising:
    employing Internet protocol security (IPSEC) authentication header (AH) methodology to derive a plurality of control messages;
    utilizing said control messages in a transport mode to provide control plane security; and,
    providing security mechanisms, wherein said security mechanisms are utilized at one of said at least one protocol layers above the IP protocol layer, wherein said Internet communications are chosen from the group consisting of asynchronous transfer mode (ATM), frame relay (FR) networking and a combination of ATM and FR communications.

2. The method of claim 1 wherein said security mechanisms comprise control plane authentication and data integrity; and, support services, said support services comprising key exchange and security database management.

3. The method of claim 1 wherein said Internet communications comprise an ATM protocol, said protocol comprising a signaling layer; and, wherein said security mechanism provides ATM transport mode security by operating at the signaling layer.

4. The method of claim 3 wherein said at least one of said control messages comprises: a header; authentication information, said information containing an integrity check value; and, ATM calling party address.

5. The method of claim 3 wherein said Internet communications occur through a plurality of ATM nodes, said method further comprising: establishing a Security Policy Database (SPD) at each ATM node, each said SPD containing separate entries for each virtual interface; and establishing a Security Association Database (SAD) at each ATM node.

6. The method of claim 1 wherein said Internet communications comprise an FR protocol, said protocol comprising a signaling layer; and, wherein said security mechanism provides FR transport mode security by operating at the signaling layer.

7. The method of claim 6 wherein said at least one of said control messages comprises: a header; authentication information, said information containing an integrity check value; and, calling party address.

8. The method of claim 6 wherein said Internet communications occur through a plurality of FR nodes, said method further comprising: establishing a Security Policy Database (SPD) at each FR node, each said SPD containing separate entries for each virtual interface; and, establishing a Security Association Database (SAD) at each FR node.

9. An apparatus for providing security for Internet communications, said communications comprising a plurality of protocol layers including an IP protocol layer and at least one protocol layer above the IP protocol layer; said apparatus comprising:
    at least one control message derivation module for deriving for said communications a plurality of control messages utilizing Internet protocol security (IPSEC) authentication header (AH) methodology;
    a control plane security module for utilizing said control messages in a transport mode at one of said at least one protocol layers above the IP protocol layer wherein said protocol layers comprise a signaling layer and said control plane security module operates at the signaling layer.

10. The apparatus of claim 9 wherein said Internet communications are chosen from the group consisting of asynchronous transfer mode (ATM), frame relay (FR) networking and a combination of ATM and FR communications.

11. The apparatus of claim 10 wherein at least one of said plurality of control messages comprises: a header; authentication information, said information containing an integrity check value; and, ATM calling party address.

12. An apparatus for providing control plane security for Internet communications, said Internet communications comprising a signaling layer and occurring over a network communication system comprising a User-Network Interface (UNI) state machine and a Private Network-Network Interface (PNNI) state machine, said apparatus comprising: a signaling state machine (SSM) employed as a shim layer protocol, wherein said SSM performs the following functions: in a case of a user incoming message, it passes an authenticated message to the signaling layer or terminates the message; in a case of a user outgoing message, it computes a message digest for the message it receives from the signaling layer, creates an Authentication Information Element (AIE) and appends the AIE to the message; in a case of a network incoming message, it forwards an authenticated message or terminates the message; and, in a case of a network outgoing message, it forwards the message.

13. The apparatus of claim 12 in which SSM further comprises a key management component.

14. The apparatus of claim 13 in which said Internet communications is selected for the group consisting of asynchronous transfer mode (ATM), frame relay (FR) networking and a combination of ATM and FR communications.

15. The apparatus of claim 13 in which said Internet communications comprises FR communications and said SSM comprises a Management Information Base (MIB) management component.

* * * * *

UNITED STATES PATENT AND TRADEMARK OFFICE
CERTIFICATE OF CORRECTION

PATENT NO. : 7,620,041 B2 Page 1 of 1
APPLICATION NO. : 10/825777
DATED : November 17, 2009
INVENTOR(S) : Dunn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1607 days.

Signed and Sealed this

Twenty-sixth Day of October, 2010

David J. Kappos
*Director of the United States Patent and Trademark Office*